(12) United States Patent
Maes et al.

(10) Patent No.: US 7,092,496 B1
(45) Date of Patent: Aug. 15, 2006

(54) METHOD AND APPARATUS FOR PROCESSING INFORMATION SIGNALS BASED ON CONTENT

(75) Inventors: Stephane Herman Maes, Danbury, CT (US); Mukund Padmanabhan, White Plains, NY (US); Jeffrey Scott Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 09/664,300

(22) Filed: Sep. 18, 2000

(51) Int. Cl.
H04M 1/652 (2006.01)

(52) U.S. Cl. .............................. 379/88.01; 379/88.08; 704/254

(58) Field of Classification Search ................... 381/58; 715/500.1; 704/200
See application file for complete search history.

(56) References Cited

U.S. PATENT DOCUMENTS

| | | | |
|---|---|---|---|
| 5,216,744 A | | 6/1993 | Alleyne et al. |
| 5,664,227 A | * | 9/1997 | Mauldin et al. .......... 715/500.1 |
| 5,848,130 A | * | 12/1998 | Rochkind ................. 379/88.01 |
| 6,144,375 A | * | 11/2000 | Jain et al. ................. 715/500.1 |
| 6,219,640 B1 | | 4/2001 | Basu et al. |
| 6,374,225 B1 | * | 4/2002 | Hejna, Jr. .................... 704/200 |
| 6,567,506 B1 | * | 5/2003 | Kermani .................. 379/88.01 |

OTHER PUBLICATIONS

U.S. Appl. No. 09/545,078, filed Apr. 7, 2000, "A Conversational Portal for Providing Conversational Browsing and Multimedia Broadcast on Demand".

U.S. Appl. No. 09/544,823, filed Apr. 6, 2000, "Methods and Systems for Multi-Modal Browsing and Implementation of a Conversational Markup Language".

U.S. Appl. No. 09/369,707, filed Aug. 6, 1999, "Methods and Apparatus for Audio-Visual Speech Detection and Recognition".

* cited by examiner

Primary Examiner—Patrice Winder
(74) Attorney, Agent, or Firm—Anne V. Dougherty; Ryan, Mason & Lewis, LLP

(57) ABSTRACT

Methods and apparatus are provided for processing an information signal containing content presented in accordance with at least one modality. In one aspect of the present invention, a method of processing an information signal containing content presented in accordance with at least one modality, comprises the steps of: (i) obtaining the information signal; (ii) performing content detection on the information signal to detect whether the information signal includes particular content presented in accordance with the at least one modality; and (iii) generating a control signal, when the particular content is detected, for use in controlling a rendering property of the particular content and/or implementation of a specific action relating to the particular content. Various illustrative embodiments in the context of speech signal processing for use in voicemail and/or cellular phone applications are provided, as well as illustrative embodiments associated with the processing of multi-modal or multimedia information signals. Also, the present invention provides for storing selectively marked information, even in the absence of content detection, such that the information may be rendered and/or used at a later time. The invention also extends to processing of text-based and markup language-based signals, e.g., XML documents.

16 Claims, 5 Drawing Sheets

METHOD AND APPARATUS FOR PROCESSING INFORMATION SIGNALS BASED ON CONTENT

FIELD OF THE INVENTION

The present invention relates generally to information signal processing techniques and, more particularly, to methods and apparatus for detecting content in an information signal and subsequently using or further processing the detected content.

BACKGROUND OF THE INVENTION

Users of existing voice mail/telephone answering machines and other equipment with voice messaging capabilities, e.g., cellular phones, are all too familiar with a classical user interface (UI) problem. The classical UI problem is associated with the fact that it is often difficult for a user to effectively extract key information, e.g., phone numbers, addresses, names, etc., from a voice message during playback. This may be due to a variety of reasons.

By way of one example, the provider or author of the message may have a tendency to rush through the portions of the message which he is very familiar with and which are repetitive for him, e.g., his name and phone number. Thus, the person listening to the message is not given enough time to write down the name and phone number of the caller during normal speed playback. One solution is to replay the entire message, which is time consuming and provides no guarantee that the listener will extract all the relevant information the second time or, for that matter, any number of subsequent times. Of course, the user could possibly slow down a subsequent playback of the message if the playback equipment has the capability to do so. However, in existing systems with equipment that is only able to slow down the entire message, subsequent playback is even more time consuming, not to mention quite frustrating. It also requires the user to perform several active physical steps to achieve such a slowed playback. Even if a portion of the played back message can be slowed down, the user must still manually search the message record, by starting and stopping the playback, until he gets to the point that he wishes to slow down.

By way of another example, the person playing back a message may not be free to write down the key information in a message because he may be occupied performing some concurrent operations, e.g., driving his vehicle, holding objects, etc.

Furthermore, it is to be understood that this classical UI problem is not limited to playback of voice messages. That is, such a UI problem exists during a real-time (live) phone conversation. In such a case, the listener still has difficulty remembering and/or transcribing important information from an on-going phone conversation, e.g., when participating in a cellular phone conversation while driving his car. In fact, the problem is made worse since the user does not have a recording of the conversation to which he may later refer to try to obtain any missed information.

It is also to be appreciated that this classical UI problem extends beyond voice or speech signals. That is, the same difficulties exist when trying to extract key information from playback or rendering of multi-modal or multimedia type information signals, e.g., signals including both audio and video information portions, or text document-based or markup language-based signals, e.g., XML documents.

Thus, there is a need for information signal processing methods and apparatus that substantially reduce and/or eliminate this classical UI problem.

SUMMARY OF THE INVENTION

The present invention provides information signal processing methods and apparatus for substantially reducing and/or eliminating the classical UI problem described above.

In one aspect of the present invention, a method of processing an information signal containing content presented in accordance with at least one modality, comprises the steps of: (i) obtaining the information signal; (ii) performing content detection on the information signal to detect whether the information signal includes particular content presented in accordance with the at least one modality; and (iii) generating a control signal, when the particular content is detected, for use in controlling at least one of a rendering property of the particular content and implementation of a specific action relating to the particular content.

In one embodiment, the modality in which the content in the information signal is presented is audio or speech-based. In another embodiment, the modality is video-based. In a further embodiment, the information signal is multimodal including audio-based and video-based content. In yet other embodiments, the invention can be extended to other media (e.g., written or typed text).

The controlled rendering property may be a presentation speed associated with the particular content, e.g., in the case of a speech signal, the speech playback speed. In the text case, the fonts can be changed (bold, color etc. . . . ). Further, the presentation speed may be controlled in accordance with detection of specific content classes in the information signal. Such content classes may include, but are not limited to, numbers, names and addresses. The types of content classes obviously depend on the type of information in the processed signal and/or the application in which such information is to be used. Further, the presentation speed of the particular content may be slowed down and/or sped up. Still further, the presentation speed of the particular content may be slowed down from an initial sped-up presentation speed.

The information processing method may further comprise the step of providing a user interface for a user to control the rendering property of the particular content and/or the implementation of the specific action relating to the particular content. The invention can also automate the execution of the specific action related to the particular content (e.g., automatic dialing of a number based on its recognition in a recorded conversation). The user may enter commands to influence the rendering property and/or the specific action relating to the particular content. For instance, in the speech signal case, the user may key-in or speak commands to set the playback speed of the detected content to approve or to request the use of the detected content in a specific action.

The information processing method may also comprise the step of marking at least a portion of the information signal in response to a user input such that the content detection step is performed on the marked portion of the information signal to detect whether the marked portion of the information signal includes the particular content. Also, the method may comprise the step of storing the particular content when detected in the information signal or marked by the user.

Various illustrative embodiments in the context of speech signal processing for use in voicemail and/or cellular phone applications are provided.

In another aspect of the present invention, a method of processing a real-time speech signal received in accordance with a communication device (e.g., a cellular phone) substantially contemporaneous with a communication session (e.g., a real-time conversation between a caller and a callee), comprises the steps of: (i) obtaining the real-time speech signal; (ii) marking at least a portion of the real-time speech signal that is at least of potential interest to a user of the communication device; and (iii) storing the marked portion for at least one of subsequent rendering and use. Advantageously, a user may then access the stored data later for some subsequent purpose and not have to be concerned with missing any key information during the communication session.

In yet another aspect of the present invention, a method of processing an information signal containing content presented in accordance with at least two modalities, comprises the steps of: (i) obtaining the information signal; (ii) separating the information signal into a first signal including information in one of the two modalities and a second signal including information in the other of the two modalities; (iii) performing content detection on the first signal to detect whether the first signal includes particular content presented in accordance with the one modality; (iv) performing content detection on the second signal to detect whether the second signal includes particular content presented in accordance with the other modality; (v) combining results associated with the content detection steps; and (vi) generating a control signal, when at least a portion of the particular content is detected in accordance with at least one of the content detection steps, for use in controlling at least one of a rendering property of the particular content and implementation of a specific action relating to the particular content.

In one embodiment, the two modalities are video-based and audio or speech-based. Further, in such an embodiment, the content detection step performed on the video signal is optical character recognition and the content detection step performed on the speech signal is speech recognition.

Note that the segments can be extracted based on the content or marked by the user. But they can also be marked based on other separate processes running on the media. For example, consider a transcription system where the transcription is associated with a confidence level. High or low confidence levels can be extracted and emphasized with different fonts or they can be separately processed, e.g., processed by a different, more robust speech recognition system, etc.

Further, text document-based signal and markup language-based signal processing embodiments according to a further aspect of the present invention are provided. For example, a system is provided for highlighting specific content in a text document (e.g., highlight e-mail addresses, names or phone numbers or digits). This enables quick extraction of a name, address or phone number or other content from a document. Automatic processing may be provided and the user can then be provided, for example, with the capability to right click (with a mouse) on the highlighted content to enable a service or commence an action. In one embodiment, the invention is implemented in an Internet (Web) based client/server arrangement such that XML (eXtensible Markup Language) documents can be annotated, parsed and rendered so that a user may select annotated content to initiate a service or action.

Also, in a further embodiment, specific text can be highlighted based on a measure calculated with respect to pattern recognition results associated with the information signal being processed.

In accordance with the above-mentioned aspects and embodiments of the invention, as well as others provided below, the present invention substantially reduces and/or eliminates the above-described classical UI problem associated with information signals.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speech signal processing environment. However, it is to be understood that the present invention is not limited to a speech signal processing environment. Rather, the invention is more generally applicable to any information signal processing environment in which it is desirable to substantially reduce and/or eliminate the classical UI problem described above, as well as other problems not expressly mentioned. For instance, the information signal processing environment may involve, but is not limited to, processing of audio signals, video signals, and/or multi-modal or multimedia type information signals (e.g., signals including both audio and video information portions).

Figure 1:
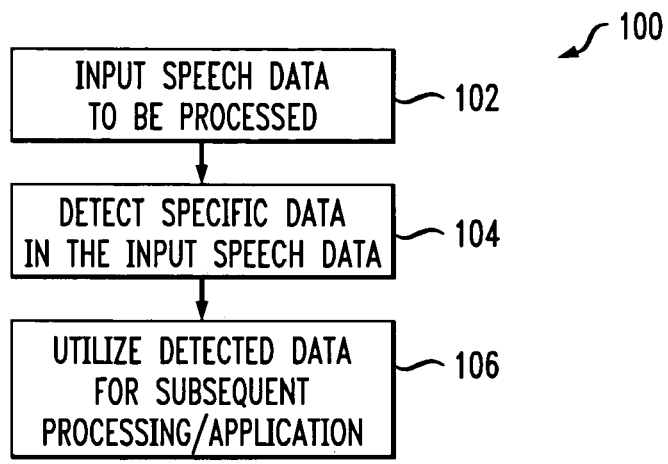
FIG. 1 is a flow diagram illustrating a general unifying concept associated with various speech signal processing embodiments of the present invention.

Referring initially to FIG. 1, a flow diagram depicts a general unifying concept associated with various speech signal processing embodiments of the present invention to be described in detail below in the context of FIG. 2 through FIG. 5. As shown, the overall methodology 100 comprises three main steps. First, in step 102, the speech signal to be processed is obtained. As will be seen in the following illustrative embodiments, this may be accomplished by inputting the speech signal to be processed in real-time, e.g., from a cellular phone, or by inputting the speech signal from a speech data storage device wherein a recorded voice message is stored. The speech signal may also be obtained in accordance with direct human interaction. For example, as will be explained, the user may mark the segments of the speech signal of interest which are to be subject to content detection and, possibly, further processing.

Next, in step 104, specific data content is detected from among the speech data obtained in step 102. The content detection operation, as will be explained, may be performed via a conventional speech recognition or word spotting system, or physically by the user. Other content extraction/detection techniques can be used within the scope of the teachings of the present invention.

Lastly, in step 106, all or portions of any detected data are utilized for subsequent processing/applications. As will be explained, in one embodiment, the detected data is further processed by applying conventional pitch-corrected time scale modification techniques so as to slow down or speed up, during playback, only the portion of the original speech signal that contains the detected content. Other methods can be considered to slow down the speech signal. In another embodiment, the detected data may be used in a subsequent application or process, e.g., a detected phone number may subsequently be automatically dialed in order to return the call. As will also be explained below, portions of the obtained speech data may be marked by a user for subsequent processing/use in accordance with step 106.

Figure 2:
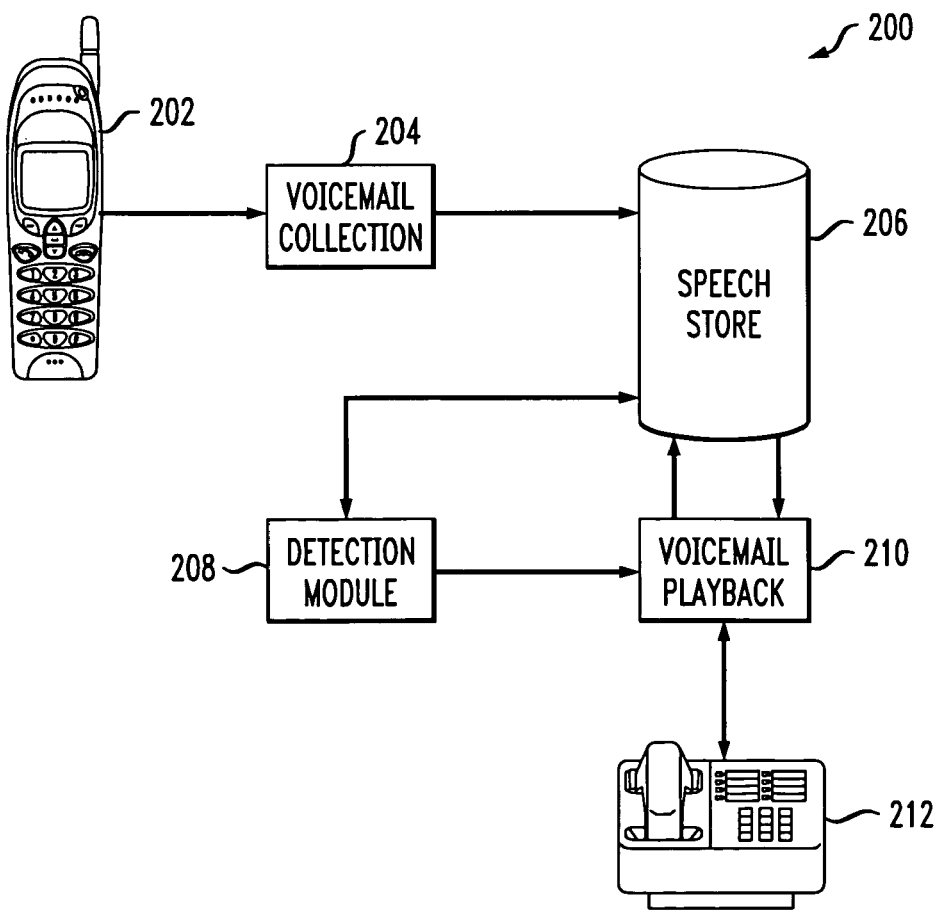
FIG. 2 is a block diagram illustrating a speech signal processing system according to one embodiment of the present invention.

Referring now to FIG. 2, a block diagram depicting a speech signal processing system according to one embodiment of the present invention is shown. The system 200 comprises: a caller phone 202 illustratively depicted as a cellular phone, although any type of phone may be used (e.g., not necessarily a cell phone or smart phone, but it can be a cordless phone, a conventional phone or an Internet VoiceIP phone); a voicemail collection module 204; a speech storage device (store) 206; a content detection module 208; a voicemail playback module 210; and a callee phone 212 illustratively depicted as a conventional handset type, although again any type of phone (e.g., smart phone) or communication device may be used.

It is to be understood that one or more of the modules 204, 208 and 210 and/or speech data store 206 may be implemented in one or more computer systems operatively connected to a conventional telephone-based communications system in which caller phone 202 and callee phone 212 operate. Each of the one or more computer systems may comprise a processor for controlling operations described herein, a memory and input/output devices, coupled to the processor. It is to be appreciated that the term "processor" as used herein is intended to include any processing device, such as, for example, one that includes a CPU (central processing unit) or other suitable processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" as used herein is intended to include, for example, one or more input devices, e.g., keyboard, for inputting data to the processing unit, and/or one or more output devices, e.g., CRT display and/or printer, for providing results associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that elements illustrated in FIG. 2 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Given the above-described illustrative speech signal processing system of FIG. 2, various voice message processing methodologies according to the invention will now be explained. While the illustrative embodiment to be described below in accordance with FIG. 2 involves content detection and processing of a speech signal associated with a stored voicemail message, it is to be appreciated that the speech signal could just as well be associated with a real-time phone conversation that is temporarily stored in a delay system. That is, for instance, a previous few seconds of a conversation may be systematically recorded. For example, as a buffer fills, the older recording is emptied. Other approaches can be used for this function. When the user detects something of interest, he marks it (via voice or key pressing). The buffer is saved in memory for later content detection, or other use or processing, instead of being progressively destroyed.

Figure 3A:
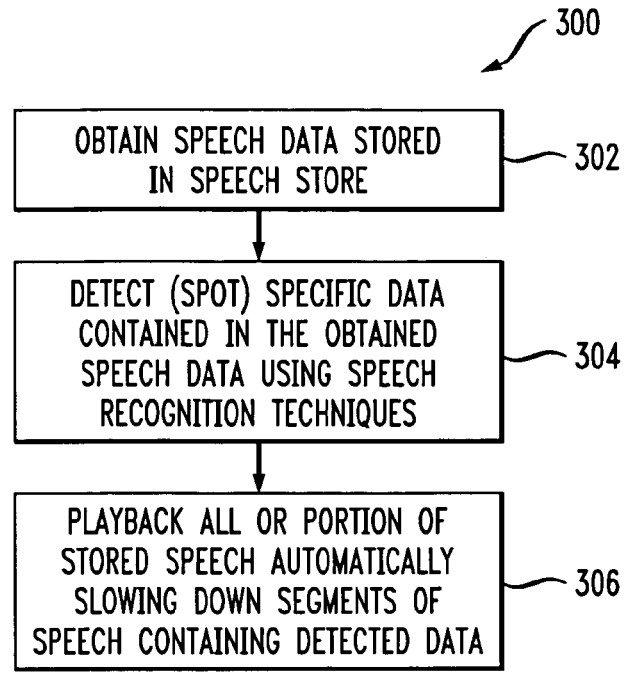
FIG. 3A is a flow diagram illustrating a speech signal processing methodology according to a first embodiment of the present invention.

Referring now to FIG. 3A, a flow diagram is shown illustrating a speech signal processing methodology according to a first embodiment of the present invention. The method 300 will be explained with reference to the elements of FIG. 2. It is assumed that a caller using phone 202 leaves a voice message intended for a person associated with phone 212. The voicemail is collected by voicemail collection module 204. The voicemail collection module may, for example, be part of an independent voicemail messaging system that is part of a company's or carrier's overall telephone system. Alternatively, the module 204 may be part of the computer system that implements the speech store 206, the content detection module 208 and the voicemail playback module 210. In any case, the voice message is collected and then stored in speech store 206. Again, the system components associated with the present invention can be feature-local to the handset or reside on the voicemail box in the user's office/home or in the voicemail system of the network (e.g., PBX store, voicemail services of a cell phone or local/long distance provider).

In accordance with FIG. 3A, the speech data associated with the voice message is retrieved and provided to the content detection module 208 (step 302). As mentioned above, the operations of the content detection module may be performed via a conventional speech recognition or word spotting system or via detection and marking by the user. Examples of such systems which may be employed herein are the ViaVoice telephony engine (available from IBM Corporation) or any telephony continuous speech recognition system can be used, even if it is only capable of detecting digits. Large vocabulary continuous speech recognition engines can be used to extract more complex information such as addresses, names, account numbers, etc.

In any case, the content detection module detects or spots specific desired data associated with specific content classes in the speech data associated with the voice message (step 304). It is assumed that the speech recognition system or word spotting system has been trained to recognize the specific data sought to be identified from the voice message. This may include, for example, data associated with such content classes as numbers, vocabulary words, key words, proper names, uncommon words (e.g., words outside of the vocabulary or foreign words), etc. The content detection module then marks (e.g., using time-marks) the segment of the voice message containing the detected data. Again, in an alternative embodiment, the user could mark the segment manually when playing back a stored segment or could at least refine it from a rougher recording (e.g., see above with respect to the description of the use of a delay system where it is to be understood that the information of interest stored in the buffer can be later refined (smaller segments) by hand or automatically). In any case, the content detection module generates a control signal which includes instruction or information as to the location of the desired content in the voice message, i.e., identification of the time-marked segment(s).

Next, the voicemail playback module 210 retrieves the same voice message processed by the content detection module. Then, based on the information in the control signal, the playback module modifies the pitch-corrected time scale associated with the marked segments so as to slow down the playback of the marked segment when the user listens to the message on phone 212 (step 306). It is to be appreciated that the time scale modification may also be used to speed up a marked segment, especially when the marked segment contains information which the user does not necessarily have to listen to carefully. Also, in a scenario where the voice message is typically replayed at a sped-up rate, the system may slow down the presentation speed of each marked segment to a normal or slower presentation speed. It is to be appreciated that the system may be preprogrammed to perform the preferred time scale modification (e.g., speed up, slow down, etc.) or the system may be responsive to preprogrammed keyed-in or spoken commands entered by the user on the phone 212 to determine what type of time scale modification to perform. Examples of such pitch-corrected time scale modification techniques which may be employed herein are disclosed in U.S. Pat. No. 5,216,744, the disclosure of which is incorporated by reference herein. However, it is to be appreciated that use of any other method to slow down the recording would not depart from the teachings of the present invention. After playback of the marked segment, the system returns to the same playback speed at which the voice message was originally recorded or at which the system is instructed to present the message. This does not prevent also allowing actions to be performed on the basis of the recognized words, as previously described.

Advantageously, as illustrated above, the present invention combines the techniques of pitch-corrected time scale modification, a feature of many voicemail and other such messaging systems, with speech recognition (word spotting) based content detection. Thus, the system automatically detects portions of a speech signal that contain information that is likely to be key to the listener and automatically alters the presentation speed of the playback so that a listener can write down the information or note its value, and more accurately or more easily check the recognized items before authorizing/confirming an associated action.

It is to be appreciated that, while the playback speed is the rendering property controlled in the illustrative embodiment described above, other rendering properties associated with the presentation of the content may be controlled in accordance with the techniques of the present invention and other methods to control the speed can also be employed.

Figure 3B:
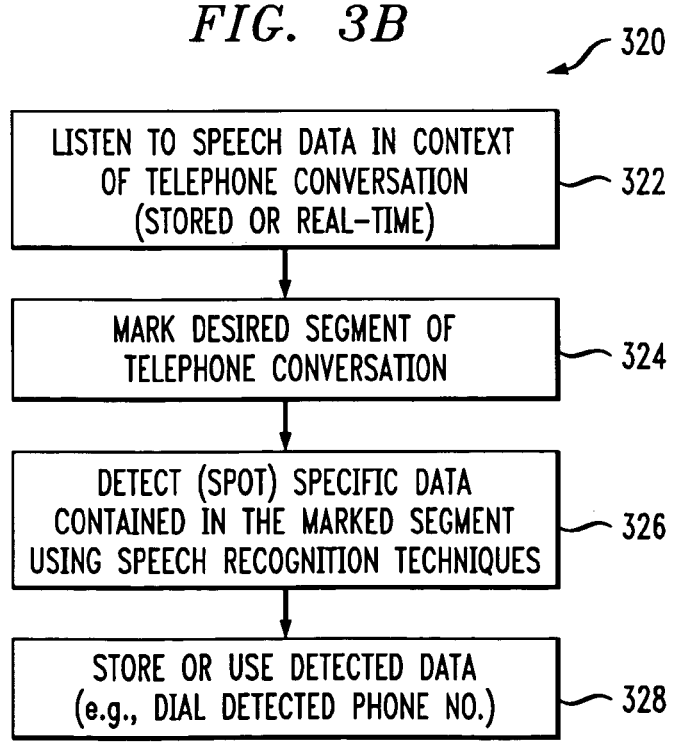
FIG. 3B is a flow diagram illustrating a speech signal processing methodology according to a second embodiment of the present invention.

Referring now to FIG. 3B, a flow diagram is shown illustrating a speech signal processing methodology according to a second embodiment of the present invention. Again, the method 320 will be explained with reference to the elements of FIG. 2. In this second illustrative embodiment, the listener at phone 212 listens to speech data associated with the a voice message stored in store 206 or speech data associated with a real-time telephone conversation being conducted with a person on phone 202 (step 322). Then, the listener at phone 212 marks a desired segment of the telephone conversation (step 324). Segment marking may be accomplished by the listener pressing preselected keys at the phone keypad. These keypad entries are associated with predetermined commands that the system has been programmed to recognize and respond to. Of course, spoken commands may also be programmed into the system. In the case when the listener is playing back a voicemail message, the listener can either mark a segment in anticipation of an upcoming portion containing important information, or he can enter a command to return to a portion previously listened to so that it can be marked. In the case when the listener is participating in a real-time telephone conversation, he can mark the segments in anticipation of an upcoming portion containing important information, or he can instruct the person on phone 202 to provide the desired information on cue.

In any case, the marked segment is provided to the content detection module 208 where specific data (for example, associated with content classes such as numbers, vocabulary words, key words, proper names, uncommon words, etc.) is recognized (step 326), as explained above. The recognized data can then be stored or used for any number of subsequent applications (step 328).

For example, if the segment contains a phone number, the content detection module may generate a control signal to instruct the system to play back the recognized phone number to the listener and, upon his selection or approval, automatically dial the number so that the listener can attempt to return the recorded call, or store the number in an electronic phone book. This may be extended to other cases, for example, where the recognized data includes addresses, memos, appointments, to do lists, etc., and/or where the user wants to reply to the voicemail or the recognized data must be transmitted elsewhere. This data may be sent to a personal information management (PIM) application running on the system. Of course, one of ordinary skill in the art will recognize many other applications for the recognized speech data generated in accordance with the present invention.

Because the system uses speech recognition techniques which are known to make recognition errors, the keypad based command capabilities of the invention, mentioned above, can also be used to mark any portion of a speech signal to speed up or slow down the playback, if a recognition error or time scale modification error is noted. Mistakes committed by the system which only result in slowing down portions of the speech signal that should not have been slowed down have little or no impact on the user experience.

It is also to be appreciated that the operations described above may be extended to applications other than voicemail, e.g., call center recording (for later examination or for immediate transfer of a query to a live operator), as well as captioning, broadcast transcription, minutes of meetings, etc.

Figure 4:
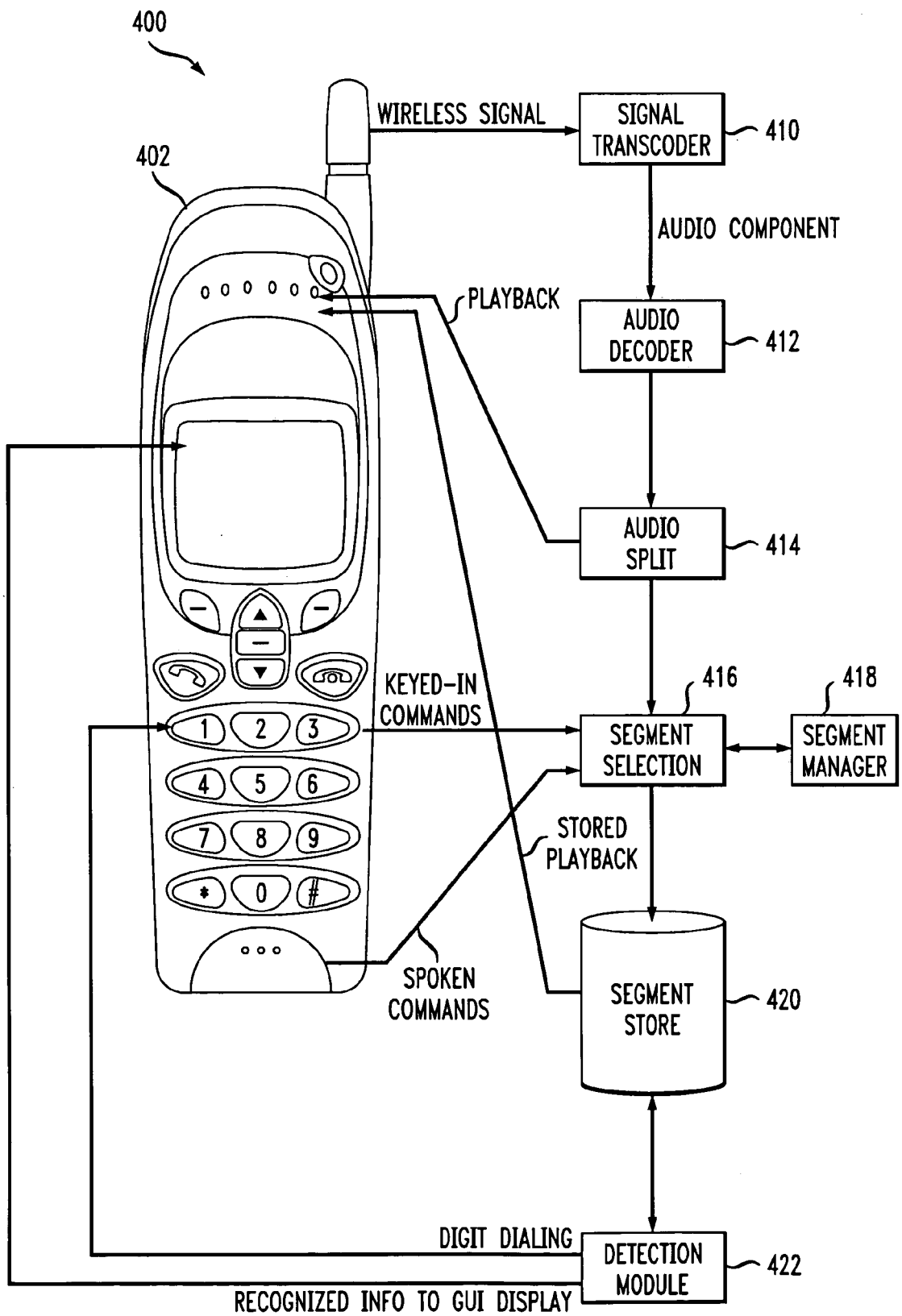
FIG. 4 is a block diagram illustrating a speech signal processing system according to another embodiment of the present invention.

Referring now to FIG. 4, a block diagram is shown illustrating a speech signal processing system according to another embodiment of the present invention. In this particular embodiment, operations are preferably performed in a cellular phone having its own processor, memory and input/output devices, although the invention is not intended to be so limited. That is, one, more or all of the processing operations to be described below may be performed in one or more computer systems, as described above in the context of the system of FIG. 2, in conjunction with a cellular phone, or some other type of communications device. In any case, as shown in FIG. 4, the system 400 contained within cellular phone 402 comprises a signal transcoder 410, an audio decoder 412, an audio splitter 414, a segment selection module 416, a segment manager 418, a segment store 420 and a content detection module 422.

Figure 5:
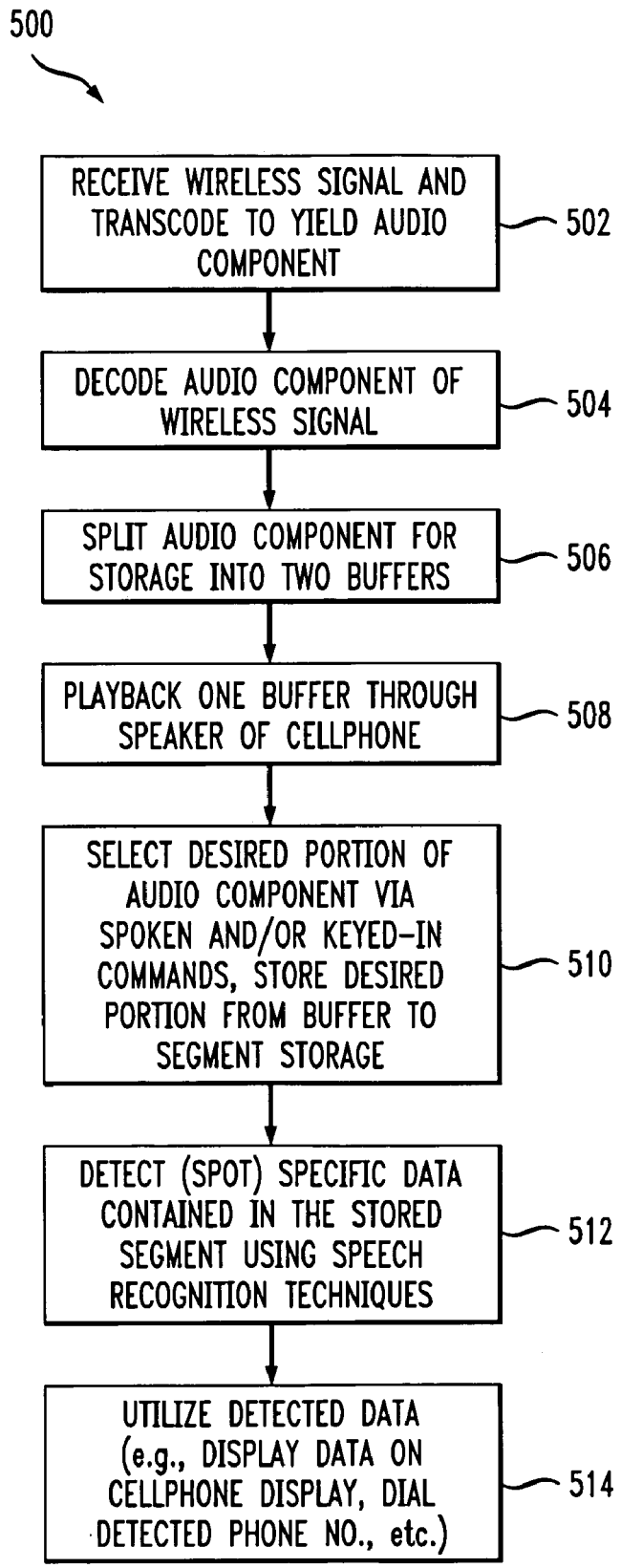
FIG. 5 is a flow diagram illustrating a speech signal processing methodology according to a third embodiment of the present invention.

Referring now to FIG. 5, a flow diagram depicts a speech signal processing methodology according to a third embodiment of the present invention. Specifically, the method 500 is preferably implemented in the system 400 of FIG. 4, and thus will be described with reference thereto.

First, the cellular phone receives a speech signal associated with a wireless phone call and transcodes the wireless signal via transcoder 410, in a conventional manner, yielding the audio component of the signal (step 502). Next, the audio component is decoded or decompressed (step 504) by decoder 412, also in a conventional manner. The decoded audio signal is then split into two streams (step 506) by audio splitter 414 and stored in two buffers, respectively. One of the buffers is played back or output to the audio speaker of the cellular phone (step 508) so that the user can hear the speech of the person at the other end of the conversation if it is a real-time conversation, or the speech data associated with a previously recorded voicemail message.

The user of the phone selects a desired portion of the audio component or speech signal as he is listening (again, in anticipation or through a subsequent playback). It is to be appreciated that, in order to facilitate selection, the audio stream may be systematically delayed to allow capture of the conversation immediately after the item of interest occurred. The selected segment is time-marked. Selection may be through keyed-in and/or spoken commands or even through speech recognition. Similar to that which is explained above in the context of FIG. 2, these commands are previously programmed in the phone. The selected or time-marked segment is retrieved from the second buffer and stored in the segment store 420 (step 510). With reference to FIG. 4, segment selection is accomplished through the keyed-in and/or spoken commands received by the segment selection module 416 under control of the segment manager 418. Next, the selected segment stored in store 420 is provided to the content detection module 422. As explained above, the content detection module detects or spots specific data contained in the stored segment using speech recognition or word spotting techniques (step 512). All or portions of the detected data may then be used (step 514) in accordance with various applications capable of being executed in accordance with the cellular phone. For example, if the detected data includes a phone number, the content detection module may generate a control signal to instruct the system to display the recognized phone number to the user on the graphical user interface of the phone and, upon his selection, automatically dial or store the number in a phone book, etc.

Of course, many other applications and functions may be realized with the data recognized according to the invention.

Many variations on the operations described above are possible. For instance, the corresponding content of both buffers (after the audio split) may be stored in memory (e.g., RAM or Flash) as a new record. The user can then manage these records to play them back, file them, with annotations, in an address book or for transcription. Other information like addresses, appointments, etc., may be stored as waveforms and transcribed later by the user if needed, or through deferred transcription if the phone is periodically synchronized with a personal computer which has larger speech recognition capabilities. Recognized data can be sent elsewhere instead of being stored locally.

Further, in the case of a phone number, the number can be played back to the user while being recognized on the fly and, upon approval or correction by the user, automatically dialed by the phone. Alternatively, even in the absence of recognition, the playback, selectively marked by the user or otherwise, can be used by the user to "remember" an audio memo or phone number so that the user can dial it manually or via digit dialing. That is, as shown in FIG. 4, all or a portion of a phone conversation may be marked for storage in segment store 420 for later presentation (e.g., display or audio playback) to the user. Of course, the stored portion may be later processed by the recognition system and then automatically dialed.

It is to be understood that, although the above embodiment is described in the context of a cellular phone, other applications can directly benefit from this methodology. For example, voicemail or answering machines can utilize the same architecture so that, while listening to messages, the user can automatically save portions. Again, this functionality is particularly beneficial when performed through the same cellular phone that is being used to retrieve the voice messages.

Accordingly, a main advantage of the present invention is the capability to capture and possibly recognize portions of phone conversations or voicemail without the user having to do anything except, in one preferred implementation, selecting the start and stop times of the segments. Without the invention, a user must: take notes by hand; remember the address or phone number until he can take notes or dial; save and replay an entire voicemail message multiple times; and/or, at a future time, completely transcribe the conversation or voicemail and inspect the transcription or use topic detection to isolate the information of interest.

As mentioned above, the present invention is not limited to speech signals. For example, the invention can be used on multi-modal or multimedia signals (e.g., television video) where recognition phases can be performed on the combined modalities or on any combination of them (i.e., audio-visual, visual only or audio only). An exemplary application of this is to allow the viewer of a movie or television program to take a snapshot of the program for later replay, recognition of addresses and other useful information (e.g., phone number, uniform resource locator (URL), name, legal disclaimer, etc.) or even objects in the still image using image or object recognition techniques. If connected to an Internet access provider or a telephone (over PSTN or voice over Internet Protocol), the user can also instantly access a web site through the URL or call the service.

In multi-modal or multimedia signals, key information is often spoken and displayed. In this case, recognition of the displayed characters can be done in parallel with recognition of the speech to offer more robust recognition of names, addresses, URLs, etc. Methodologies for performing such robust parallel audio-visual recognition are described in U.S. patent applications identified as U.S. Ser. Nos. 09/369,706 and 09/369,707, both filed on Aug. 6, 1999, and respectively entitled: "Methods And Apparatus for Audio-Visual Speaker Recognition and Utterance Verification" and "Methods And Apparatus for Audio-Visual Speech Detection and Recognition," the disclosures of which are incorporated by reference herein. As described therein, the recognition results associated with each individual modality can be combined via feature fusion, score combination, or serial rescoring.

Displayed characters may be recognized with optical character recognition (OCR) technology. Phone numbers recognized out of the audio channel are correlated with the character recognized from add-on characters on the screen or display characters. Add-on characters are characters added to a video signal in accordance with the well-known technique of encrustation. Encrustation is a technique where text is overlayed on a video, e.g., closed captions added to a television broadcast, etc. Such a multi-modal OCR/speech recognition system provides another illustrative implementation of the inventive methodologies described herein.

Figure 6:
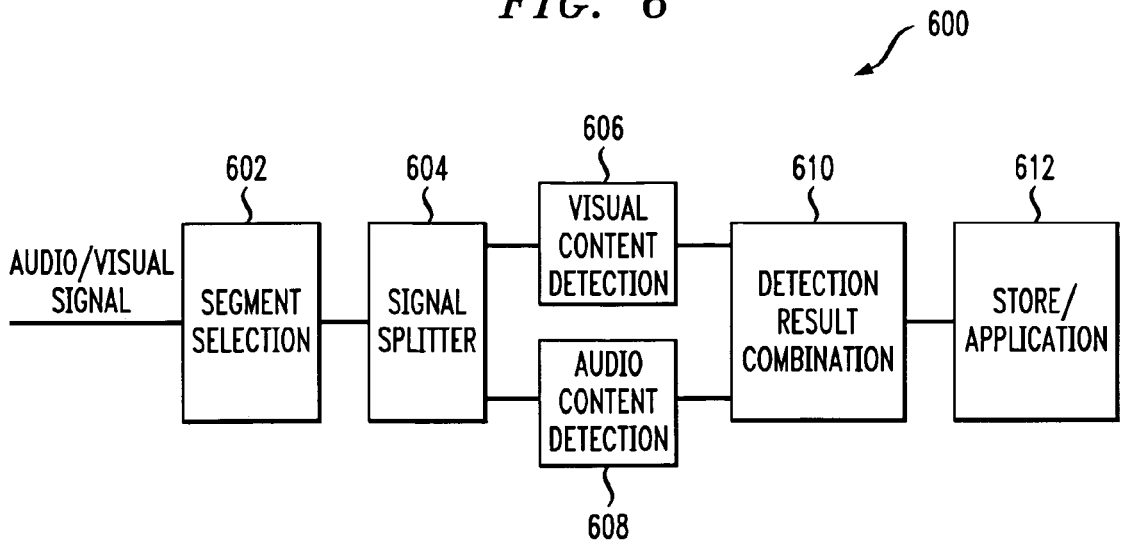
FIG. 6 is a block diagram illustrating an audio/visual signal processing system according to an embodiment of the present invention.

FIG. 6 depicts an illustrative system 600 for processing such multi-modal information signals according to an embodiment of the present invention. Again, such system may be implemented in one or more processor-based systems as described above. As shown, selection of one or more segments of the audio/visual signal is performed in block 602 by the user, as explained above. The audio/visual signal is then split in block 604. The video signal is then subjected to visual content detection, e.g., OCR, in block 606, while the audio signal is subjected to audio content detection, e.g., speech recognition or word spotting, in block 608, as explained above. The recognition results in each path may then be combined in block 610, e.g., via one or more of the methods described in the above-referenced U.S. patent applications identified as U.S. Ser. Nos. 09/369,706 and 09/369,707. The detected data from the audio/visual signal, if any, can then be stored or used in a subsequent application (block 612) in accordance with one or more instructional control signals generated by the detection modules, as explained above.

It is possible to also extend the scope of the invention to media other than that associated with audio, speech, video, multi-modal and multimedia channels. In one extension of the invention, a system may be implemented that highlights specific content in a text document (e.g., highlight e-mail addresses, names or phone numbers or digits). The specific content may be highlighted in a variety of ways, e.g., the specific content has a different text font or color from other content, etc. The invention is not limited to any particular highlighting technique. Thus, the invention enables quick extraction of a name, address or phone number or other content from a document. Again, automatic content detection and/or other processing may be provided and the user can then be provided, for example, with the capability to right click (with a mouse) on the highlighted content.

Note that the determination of the segments to extract and highlight does not have to rely on the immediate semantic content. For example, if the text results from the transcription (or other conversational processing) of an audio/speech segment, the segments can be highlighted on the basis of other measures like: (i) identity of a speaker; and/or (ii) confidence level of the result of the processing by one of the conversational engines (e.g., confidence level of correct recognition of a word or sentence); etc.

Note that the format of these documents is not relevant. They can be in ASCII or in a particular proprietary format. In particular, they can be XML (extensible Markup Language) or HTML (HyperText Markup Language) documents.

Figure 7:
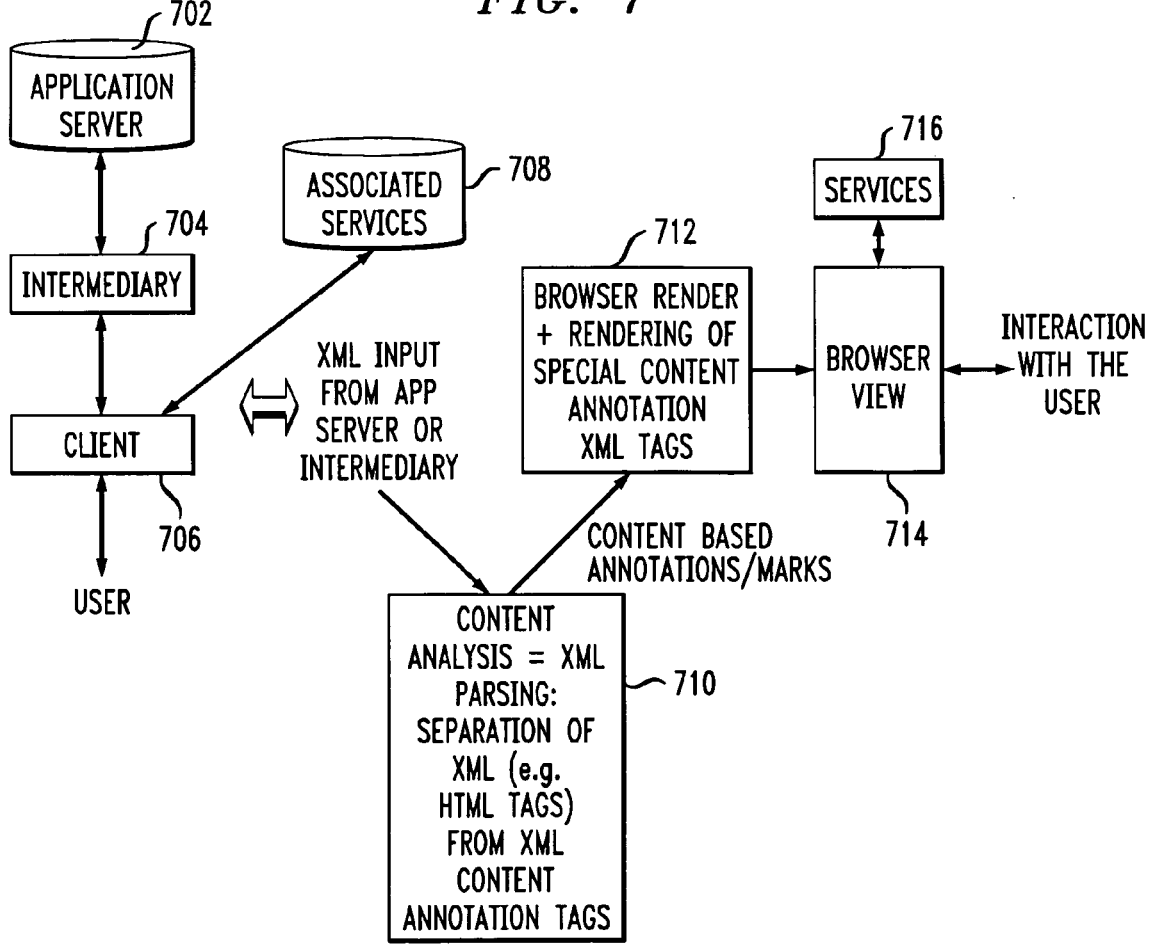
FIG. 7 is a block diagram illustrating a text document-based signal processing system according to an embodiment of the present invention

An example of this alternative embodiment is illustrated in FIG. 7. FIG. 7 shows a particular case of the previous example where the nature of the content is annotated by the content provider, an intermediary or the user using XML syntax.

A document, especially an XML (or WML—Wireless Markup Language, HTML, VoiceXML, or CML—Conversational Markup Language as described in U.S. Ser. No. 09/544,823, filed on Apr. 6, 2000 and entitled "Methods and Systems for Multi-modal Browsing and Implementation of a Conversational Markup Language;" and U.S. Ser. No. 09/545,078, filed Apr. 7, 2000 and entitled "A Conversational Portal for Providing Conversational Browsing and Multimedia Broadcast On Demand," the disclosures of which are incorporated by reference herein, etc.) document, can be annotated, also in XML. This annotation can be done at the source by the application developer or service provider (application server 702), it can be done in the network (intermediary 704) or by the user on the client device 706. This annotation is again based on the content as determined automatically or manually by the application developer or the business logic of the service provider, network intermediates or the user. The associated segments can be marked, among other things, with XML tags. These tags can be associated to a service provided locally or elsewhere on the Web (associated services 708). By right clicking on the XML tagged items or by giving another prearranged command, the user can activate an action associated to it (out of a menu of possible actions).

When activated, its results can result into an action, e.g., to: (i) activate a service pointed to by the XML tags (by uniform resource identifier (URI) reference); (ii) annotate a service to be added to the menu of what is available for this particular segment or for this type of XML tag; etc. Also, as an alternative to the service being pointed to by a link (e.g., in another color) that can be right-clicked on by the user to activate and/or display the service, the service can instead be automatically loaded and executed in the user's browser, e.g., a periodically updated text like the real time value of a stock quote provided by a provider other than the original content provider.

As shown in FIG. 7, an XML input signal is subjected to content analysis in block 710. Here the XML content is parsed, i.e., the XML is separated from the XML content annotation tags. Then, in block 712, the browser is rendered along with the rendering of the special content annotation tags or marks separated out in block 710. The browser view 714 is what the user interacts with to view the marked content. The user can then click on the marked content, e.g., XML tagged item, thereby activating an action or service 716 associated therewith. It is to be appreciated that in one embodiment, the content analysis (710), renderings (712), browser view (714) and services (716) are implemented on the client computer system (706), although the invention is not so limited. Also, as previously mentioned, annotation may be done at the application server computer system, an intermediary computer system and/or the client computer system.

As an example, the service provider, web intermediary (e.g., portal or ISP—Internet Service Provider) or user can decide to point every stock quote and company names to a service provider that provides instant real-time quotes and charts for the company. By right clicking in his browser on the items that have been annotated by one of these parties, he can now automatically check the stock price and research result of the different company in every HTML document (or WML or VoiceXML or CML).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of processing an information signal containing content presented in accordance with at least one modality, the method comprising the steps of:
   obtaining the information signal, wherein the information signal represents speech obtained in accordance with one of a voice message system and a real-time phone conversation;
   marking a portion of the information signal in response to a user input such that a content detection step is performed on the marked portion of the information signal to detect whether the marked portion of the information signal includes particular content;
   performing content detection on the information signal to detect whether the information signal includes the particular content presented in accordance with the at least one modality; and
   automatically generating a control signal as a direct result of detection of the particular content without a need for a selective input by a user contemporaneous with the detection of the content, for use in automatically controlling at least one of a rendering property of the particular content and automatic implementation of a specific action relating to the particular detected content.

2. The method of claim 1, wherein the at least one modality in which the content in the information signal is presented is audio-based.

3. The method of claim 1, wherein the controlled rendering property is a presentation speed of the particular content.

4. The method of claim 3, wherein the presentation speed is controlled in accordance with detection of specific content classes in the information signal.

5. The method of claim 4, wherein a specific content class comprises one of numbers, names and addresses.

6. The method of claim 3, wherein the presentation speed of the particular content is at least one of slowed down and sped up.

7. The method of claim 3, wherein the presentation speed of the particular content is slowed down from an initial sped-up presentation speed.

8. The method of claim 1, further comprising the step of providing a user interface for a user to control at least one of the rendering property of the particular content and the implementation of the specific action relating to the particular content.

9. The method of claim 1, further comprising the step of storing the particular content when detected in the information signal.

10. A method of processing an information signal containing content presented in accordance with at least one modality, the method comprising the steps of:
    obtaining the information signal, wherein the information signal represents speech obtained in accordance with one of a voice message system and a real-time phone conversation;
    marking a portion of the information signal in response to a user input;
    performing content detection on the portion of the information signal to detect whether the marked portion of the information signal includes desired content presented in accordance with the at least one modality; and
    at least one of storing and utilizing the desired content in a subsequent application when detected in the information signal.

11. A method of processing an information signal containing content presented in accordance with at least two modalities, the method comprising the steps of:
    obtaining the information signal;
    marking a portion of the information signal in response to a user input such that at least one content detection step is performed on the marked portion of the information signal to detect whether the marked portion of the information signal includes particular content;
    separating the marked portion of the information signal into a first signal including information in one of the two modalities and a second signal including information in the other of the two modalities;
    performing content detection on the first signal to detect whether the first signal includes the particular content presented in accordance with the one modality;
    performing content detection on the second signal to detect whether the second signal includes the particular content presented in accordance with the other modality;
    combining results associated with the content detection steps; and
    automatically generating a control signal as a direct result of detection of at least a portion of the particular content in accordance with at least one of the content detection steps without a need for a selective input by a user contemporaneous with the detection of the content, for use in automatically controlling at least one of a rendering property of the particular content and automatic implementation of a specific action relating to the particular detected content.

12. The method of claim 11, wherein the two modalities are video and audio.

13. The method of claim 12, wherein the content detection step performed on the video signal is optical character recognition and the content detection step performed on the audio signal is speech recognition.

14. Apparatus for processing an information signal containing content presented in accordance with at least one modality, the apparatus comprising:
    at least one processor operative to: (i) obtain the information signal, wherein the information signal represents speech obtained in accordance with one of a voice message system and a real-time phone conversation; (ii) mark a portion of the information signal in response to a user input such that a content detection step is performed on the marked portion of the information signal to detect whether the marked portion of the information signal includes particular content; (iii) perform content detection on the information signal to detect whether the information signal includes the particular content presented in accordance with the at least one modality; and (iv) automatically generate a control signal as a direct result of detection of the particular content without a need for a selective input by a user contemporaneous with the detection of the content, for use in automatically controlling at least one of a rendering property of the particular content and automatic implementation of a specific action relating to the particular detected content.

15. Apparatus for processing an information signal containing content presented in accordance with at least one modality, the apparatus comprising:

at least one processor operative to: (i) obtain the information signal, wherein the information signal represents speech obtained in accordance with one of a voice message system and a real-time phone conversation; (ii) mark a portion of the information signal in response to a user input; (iii) perform content detection on the portion of the information signal to detect whether the marked portion of the information signal includes desired content presented in accordance with the at least one modality; and (iv) at least one of store and utilize the desired content in a subsequent application when detected in the information signal.

16. Apparatus for processing an information signal containing content presented in accordance with at least two modalities, the apparatus comprising:

at least one processor operative to: (i) obtain the information signal; (ii) mark a portion of the information signal in response to a user input such that at least one content detection step is performed on the marked portion of the information signal to detect whether the marked portion of the information signal includes particular content; (iii) separate the marked portion of the information signal into a first signal including information in one of the two modalities and a second signal including information in the other of the two modalities; (iii) perform content detection on the first signal to detect whether the first signal includes the particular content presented in accordance with the one modality; (v) perform content detection on the second signal to detect whether the second signal includes the particular content presented in accordance with the other modality; (vi) combine results associated with the content detection steps; and (vii) automatically generate a control signal; as a direct result of detection of at least a portion of the particular content in accordance with at least one of the content detection steps without a need for a selective input by a user, for use in automatically controlling at least one of a rendering property of the particular content and automatic implementation of a specific action relating to the particular detected content.

* * * * *